US012745786B2

(12) United States Patent
Thomas et al.

(10) Patent No.: US 12,745,786 B2
(45) Date of Patent: Sep. 29, 2026

(54) COMPOSITIONS WITH NOVEL CANNABINOID AND TERPENE PROFILES

(71) Applicant: Natural Extraction Systems, LLC, Boulder, CO (US)

(72) Inventors: C. Russell Thomas, Boulder, CO (US); Douglas G. Metcalf, Boulder, CO (US)

(73) Assignee: Natural Extraction Systems, LLC, Boulder, CO (US)

( * ) Notice: Subject to any disclaimer, the term of this patent is extended or adjusted under 35 U.S.C. 154(b) by 1298 days.

(21) Appl. No.: 17/312,359

(22) PCT Filed: Dec. 9, 2019

(86) PCT No.: PCT/US2019/065236
§ 371 (c)(1),
(2) Date: Jun. 9, 2021

(87) PCT Pub. No.: WO2020/123383
PCT Pub. Date: Jun. 18, 2020

(65) Prior Publication Data

US 2022/0015397 A1 Jan. 20, 2022

Related U.S. Application Data

(60) Provisional application No. 62/942,437, filed on Dec. 2, 2019, provisional application No. 62/860,223, filed on Jun. 11, 2019, provisional application No. 62/777,621, filed on Dec. 10, 2018.

(51) Int. Cl.
*A23L 2/52* (2006.01)
*A23L 2/38* (2021.01)

(52) U.S. Cl.
CPC .. *A23L 2/52* (2013.01); *A23L 2/38* (2013.01)

(58) Field of Classification Search
None
See application file for complete search history.

(56) References Cited

U.S. PATENT DOCUMENTS 6,949,582 B1 9/2005 Wallace
2012/0046352 A1 2/2012 Hospodor
2017/0266153 A1* 9/2017 Levy .................... A61K 33/00

FOREIGN PATENT DOCUMENTS

CA 2977802 A1 9/2016
WO 2017192527 A1 11/2017
WO 2018152334 A1 8/2018
WO 2018200888 A1 11/2018
WO 2019003163 A2 1/2019
WO 2019087074 A2 5/2019

OTHER PUBLICATIONS

D. Gold., "Cannabus Alchemy". Ronin Publishing, Inc. Fourteenth Printing, 1993 (Year: 1993).*
Izzo et al., "Non-psychotropic plant cannabinoids: new therapeutic opportunities from and ancient herb". Trends in Pharmacological Sciences vol. 30, No. 10, pp. 515-527. (Year: 2009).*
"CBG". Available online at https://www.crescolabs.com/cannabinoids/cbg/ (Year: 2017).*
"Humulene epoxide II". Available online at https://www.chemfaces.com/natural/Humulene-epoxide-II-CFN98008.html. (Year: 2016).*
Fidyt et al., "Beta caryophyllene and beta-caryophyllene oxide-natural compounds of anticancer and analgesic properties". Cancer Medicine vol. 5, Issue 10, 2016. (Year: 2016).*
"Terpenes of Cannabis: Pinene and Humulene". Available online at https://gorgegreenery.com/ggblog/2017/5/18/terpenes-of-cannabis-pinene-and-humulene. (Year: 2017).*
Ganguly "Flavoring Agents Used in Indian Cooking and Their Anticarcinogenic Properties". Asian Pacific Journal of Cancer Prevention, 11, 25-28 (2010). (Year: 2010).*
"Flavor Activity of Sesquiterpene Oxidation Products formed upon lab-scaled boiling of a hop essential oil-derived sesquiterpene hydrocarbon fraction (cv. Saaz)" Journal of the American society of brewing chemists vol. 74, 2016, issue 1. (Year: 2016).*

* cited by examiner

*Primary Examiner* — Erik Kashnikow
*Assistant Examiner* — Assaf Zilbering
(74) *Attorney, Agent, or Firm* — Douglas G. Metcalf

(57) ABSTRACT

This patent document discloses combinations of cannabinoids, terpenes, terpene oxidation products, and stereoisomers of cannabinoids and terpene oxidation products.

20 Claims, No Drawings

COMPOSITIONS WITH NOVEL CANNABINOID AND TERPENE PROFILES

RELATED APPLICATIONS

This patent application is the United States national stage under 35 U.S.C. § 371 of International Application No. PCT/US19/65236, which claims priority to U.S. Provisional Patent Application No. 62/777,621, filed Dec. 10, 2018; U.S. Provisional Patent Application No. 62/860,223, filed Jun. 11, 2019; and U.S. Provisional Patent Application No. 62/942,437, filed Dec. 2, 2019, each of which is incorporated by reference in its entirety.

BACKGROUND

Cannabis flowers biosynthetically produce cannabigerolic acid, which is a carboxylic acid. The flowers can then cyclize the cannabigerolic acid into cannabidiolic acid, tetrahydrocannabinolic acid, and cannabichromenic acid at varying ratios depending on the phenotype of the cannabis strain. These cannabinoid carboxylic acids lack robust pharmacological properties in humans relative to their decarboxylated analogs cannabigerol, cannabidiol, tetrahydrocannabinol, and cannabichromene because cannabinoid receptor binding sites are imbedded in lipid membranes that are generally inaccessible to carboxylic acids.

Cannabinoid carboxylic acids are generally decarboxylated to produce cannabigerol, cannabidiol, tetrahydrocannabinol, and cannabichromene by heating at a temperature greater than 100 degrees Celsius for a period of time ranging from 30 minutes for boutique production to more than 6 hours for large-scale commercial production. Heating results in thermal degradation including the oxidation of cannabinoids into cannabinol and a significant loss of cannabigerolic acid (see, for example, Wang et al., CANNABIS AND CANNABINOID RESEARCH, 2016, 1(1):262, which suggests that greater than 50 percent of cannabigerolic acid is lost during decarboxylation performed for 60 minutes at temperatures ranging from 80 to 145 degrees Celsius).

Cannabis also biosynthetically produces a variety of terpenes, which may also have pharmacological properties. The precise terpene content of a decarboxylated cannabis extract depends upon (1) the strain of cannabis (for example, True Terpenes (Portland, Oreg.) manufactures terpene blends that approximate the terpene profiles of popular marijuana strains); (2) the cannabis extraction method; (3) the cannabinoid decarboxylation method; and (4) purification methods such as solvent removal, distillation, carbon-filtering, and chromatography.

Many terpenes are thermally degraded during decarboxylation. Beta-caryophyllene and humulene, for example, can be oxidized. Heating also thermally degrades amines and sulfides, which result in unpleasant flavors and aromas, and the purification of cannabinoids from amines and sulfides results in further loss of terpenes.

Cannabinoid compositions that lack significant thermal degradation products are desirable.

SUMMARY

This patent document discloses combinations of cannabinoids, terpenes, terpene oxidation products, and stereoisomers of cannabinoids and terpene oxidation products.

DETAILED DESCRIPTION

U.S. patent application Ser. No. 16/271,782 describes methods to decarboxylate cannabinoid carboxylic acids in the vapor phase in approximately two seconds, which is a substantial improvement over conventional lipid-phase decarboxylation. The improved methods (1) minimize the thermal degradation of an extract; (2) recover high concentrations of terpenes; and (3) eliminate the need for post-decarboxylation purification. Products made from industrial hemp extract that is decarboxylated in the vapor phase display significantly increased pharmacological efficacy per milligram of cannabidiol relative to other commercial products across a wide range of medical conditions including anxiety, pain, autism spectrum disorders, and Down syndrome.

The chemical properties of industrial hemp extract that result in improved pharmacological effects remain unknown. This patent document nevertheless discloses novel features of the chemical fingerprint of cannabis extracts that underwent vapor-phase decarboxylation, including: (1) the relative abundance of cannabigerol and cannabigerovarin, which are recovered at higher yields using vapor-phase decarboxylation relative to lipid-phase decarboxylation; (2) the relative absence of cannabinol and cannabivarin, which are oxidation products of tetrahydrocannabinol and tetrahydrocannabivarin, respectively, that are produced during decarboxylation; (3) the relative abundance of terpenes, which depend upon numerous variables that include exposure to elevated temperatures during decarboxylation; and (4) the relative amounts of terpene oxidation products and other terpene thermal degradation products, which vary depending upon exposure to elevated temperatures during decarboxylation and numerous other factors. This patent document also discloses other related characteristics that help differentiate cannabinoid extracts that are decarboxylated in the vapor phase from cannabinoid extracts that are decarboxylated in the lipid phase.

While each of the disclosed and claimed compositions may be obtained by the vapor-phase decarboxylation of a cannabis extract, the compositions may also be prepared by combining purified cannabinoids, terpenes, and terpene oxidation products at the ratios disclosed in this patent document.

The molecular structures and chemical names of various cannabinoids, terpenes, and terpene oxidation products that are featured in this patent document are set forth in Formulas I, II, III, IV, V, VI, VII, VIII, IX, X, XI, XII, XIII, XIV, XV, XVI, XVII, XVIII, IX, and XX and in Table 1 below.

(I)

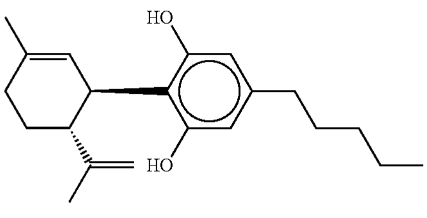

Cannabidiol (II)

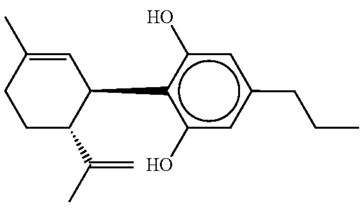

Cannabidivarin

-continued
(III)
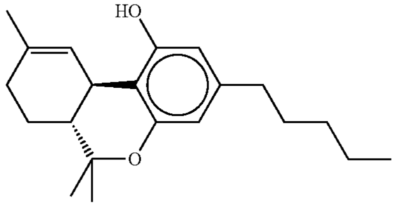
Tetrahydrocannabinol
(IV)
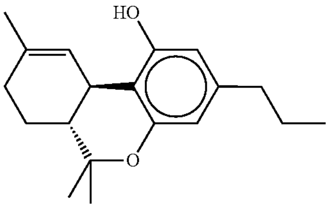
Tetrahydrocannabivarin
(V)
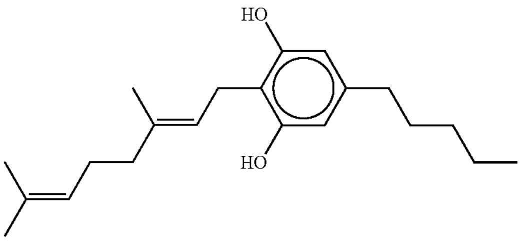
Cannabigerol
(VI)
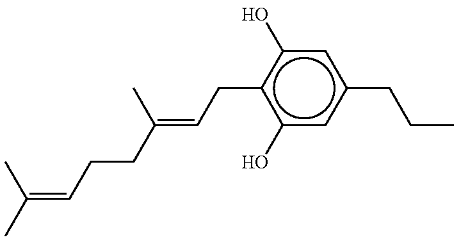
Cannabigerovarin
(VII)
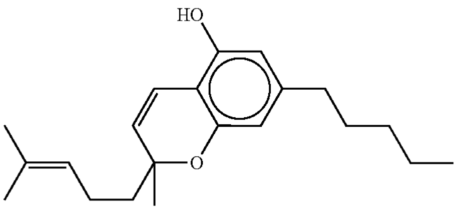
Cannabichromene
(VIII)
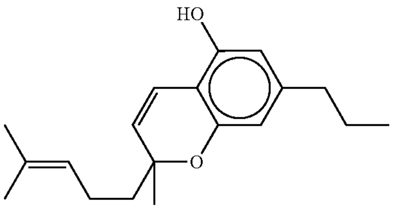
Cannabichromevarin
-continued
(IX)
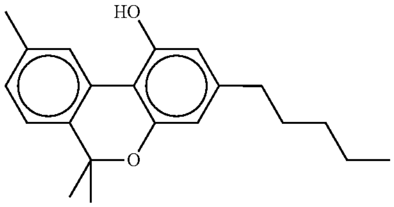
Cannabinol
(X)
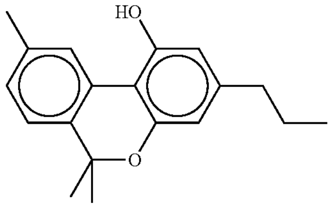
Cannabivarin
(XI)
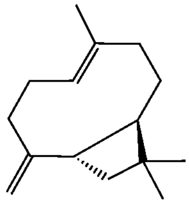
Beta-Caryophyllene
(XII)
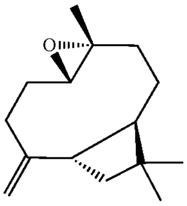
Caryophyllene Oxide
(XIII)
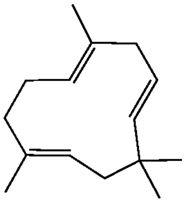
Humulene
(XIV)
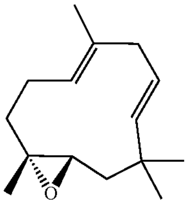
Humulene Epoxide I -continued (XV)

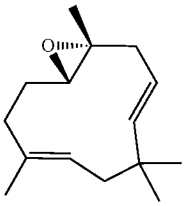

Humulene Epoxide II (XVI)

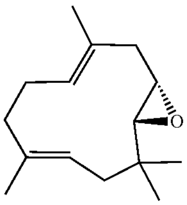

Humulene Epoxide III (XVII)

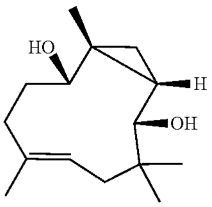

Bicyclohumuladiol

-continued (XVIII)

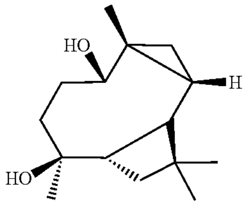

Tricyclohumuladiol (XIX)

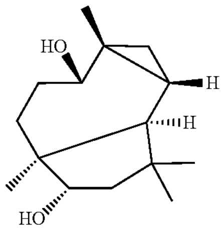

Tricyclohumuladiol II (XX)

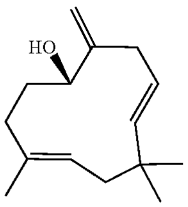

Humulenol II

TABLE 1

Names of the Molecules of Formulas I-XX

| Formula | Common Name | Chemical Name |
|---|---|---|
| I | Cannabidiol | 2-[(1R,6R)-6-isopropenyl-3-methylcyclohex-2-en-1-yl]-5-pentylbenzene-1,3-diol |
| II | Cannabidivarin | 2-[(1R,6R)-6-isopropenyl-3-methylcyclohex-2-en-1-yl]-5-propylbenzene-1,3-diol |
| III | Tetrahydrocannabinol | (6aR,10aR)-6,6,9-trimethyl-3-pentyl-6a,7,8,10a-tetrahydro-6H-benzo[c]chromen-1-ol |
| IV | Tetrahydrocannabivarin | (6aR,10aR)-6,6,9-trimethyl-3-propyl-6a,7,8,10a-tetrahydro-6H-benzo[c]chromen-1-ol |
| V | Cannabigerol | 2-[(2E)-3,7-dimethylocta-2,6-diene-1-yl]-5-pentylbenzene-1,3-diol |
| VI | Cannabigerovarin | 2-[(2E)-3,7-dimethylocta-2,6-diene-1-yl]-5-propylbenzene-1,3-diol |
| VII | Cannabichromene | 2-methyl-2-(4-methylpent-3-en-1-yl)-5-hydroxy-7-pentyl-2H-1-benzopyran* |
| VIII | Cannabichromevarin | 2-methyl-2-(4-methylpent-3-en-1-yl)-5-hydroxy-7-propyl-2H-1-benzopyran* |
| IX | Cannabinol | 6,6,9-trimethyl-3-pentyl-6H-benzo[c]chromen-1-ol |
| X | Cannabivarin | 6,6,9-trimethyl-3-propyl-6H-benzo[c]chromen-1-ol |
| XI | Beta-caryophyllene | (1R,4E,9S)-4,11,11-trimethyl-8-methylidenebicyclo[7.2.0]undec-4-ene |
| XII | Caryophyllene oxide | (1R,4R,6R,10S)-4,12,12-trimethyl-9-methylene-5-oxatricyclo[8.2.0.0$^{4,6}$]dodecane |
| XIII | Humulene | (1E,4E,8E)-2,6,6,9-tetramethyl-1,4,8-cycloundecatriene |
| XIV | Humulene epoxide I | (1S,4E,7E,11S)-1,5,9,9-tetramethyl-12-oxabicyclo[9.1.0]dodeca-4,7-diene |
| XV | Humulene epoxide II | (1R,3E,7E,11R)-1,5,5,8-tetramethyl-12-oxabicyclo[9.1.0]dodeca-3,7-diene |
| XVI | Humulene epoxide III | (1R,3E,7E,11R)-3,7,10,10-tetramethyl-12-oxabicyclo[9.1.0]dodeca-3,7-diene |
| XVII | Bicyclohumuladiol | (2R,9S)-1,5,8,8-tetramethylbicyclo[8.1.0]undec-5-ene-2,9-diol |
| XVIII | Tricyclohumuladiol | (1R,2R,4R,5R,8S,9S)-4,8,11,11-tetramethyltricyclo[7.2.0.0$^{2,4}$]undecane-5,8-diol |

TABLE 1-continued

| Names of the Molecules of Formulas I-XX | | |
|---|---|---|
| Formula | Common Name | Chemical Name |
| XIX | Tricyclohumuladiol II | (1S,2R,4R,5R,8S,9S)-4,8,11,11-tetramethyltricyclo[6.3.0.0$^{2,4}$]undecane-5,9-diol |
| XX | Humulenol II | (1R,4Z,8Z)-6,6,9-trimethyl-2-methylene-4,8-cycloundecadien-1-ol |

*Each of cannabichromene and cannabichromevarin has two stereoisomers; the name cannabichromene encompasses both stereoisomers; and the name cannabichromevarin encompasses both stereoisomers.

Various aspects of this patent document relate to a composition, comprising (i) the cannabinoid cannabigerol, (ii) the terpenes beta-caryophyllene and humulene, and (iii) the terpene oxidation products caryophyllene oxide and humulene epoxide II, in which: the composition comprises cannabigerol and beta-caryophyllene at a ratio of at least 1:5 and no greater than 100:1 by mass; the composition comprises cannabigerol and caryophyllene oxide at a ratio of at least 1:1 and no greater than 500:1 by mass; the composition comprises cannabigerol and humulene at a ratio of at least 1:5 and no greater than 100:1 by mass; and the composition comprises cannabigerol and humulene epoxide II at a ratio of at least 1:1 and no greater than 500:1 by mass.

Various aspects of this patent document relate to a composition, comprising (i) the cannabinoid cannabigerovarin, (ii) the terpenes beta-caryophyllene and humulene, and (iii) the terpene oxidation products caryophyllene oxide and humulene epoxide II, in which: the composition comprises cannabigerovarin and beta-caryophyllene at a ratio of at least 1:5 and no greater than 100:1 by mass; the composition comprises cannabigerovarin and caryophyllene oxide at a ratio of at least 1:1 and no greater than 500:1 by mass; the composition comprises cannabigerovarin and humulene at a ratio of at least 1:5 and no greater than 100:1 by mass; and the composition comprises cannabigerovarin and humulene epoxide II at a ratio of at least 1:1 and no greater than 500:1 by mass.

Various aspects of this patent document relate to a composition, comprising (i) the cannabinoid cannabidiol, (ii) the terpenes beta-caryophyllene and humulene, and (iii) the terpene oxidation products caryophyllene oxide and humulene epoxide II, in which: the composition comprises cannabidiol and beta-caryophyllene at a ratio of at least 1:1 and no greater than 500:1 by mass; the composition comprises cannabidiol and caryophyllene oxide at a ratio of at least 10:1 and no greater than 5,000:1 by mass; the composition comprises cannabidiol and humulene at a ratio of at least 1:1 and no greater than 500:1 by mass; and the composition comprises cannabidiol and humulene epoxide II at a ratio of at least 10:1 and no greater than 5,000:1 by mass.

Various aspects of this patent document relate to a composition, comprising (i) the cannabinoid cannabidivarin, (ii) the terpenes beta-caryophyllene and humulene, and (iii) the terpene oxidation products caryophyllene oxide and humulene epoxide II, in which: the composition comprises cannabidivarin and beta-caryophyllene at a ratio of at least 1:5 and no greater than 100:1 by mass; the composition comprises cannabidivarin and caryophyllene oxide at a ratio of at least 1:1 and no greater than 500:1 by mass; the composition comprises cannabidivarin and humulene at a ratio of at least 1:5 and no greater than 100:1 by mass; and the composition comprises cannabidivarin and humulene epoxide II at a ratio of at least 1:1 and no greater than 500:1 by mass.

In some embodiments, the composition either (i) lacks tetrahydrocannabinol or (ii) comprises the cannabinoid at a greater concentration by mass than any tetrahydrocannabinol that is present in the composition.

Various aspects of this patent document relate to a composition, comprising (i) the cannabinoid tetrahydrocannabinol, (ii) the terpenes beta-caryophyllene and humulene, and (iii) the terpene oxidation products caryophyllene oxide and humulene epoxide II, in which: the composition comprises tetrahydrocannabinol and beta-caryophyllene at a ratio of at least 1:1 and no greater than 500:1 by mass; the composition comprises tetrahydrocannabinol and caryophyllene oxide at a ratio of at least 10:1 and no greater than 5,000:1 by mass; the composition comprises tetrahydrocannabinol and humulene at a ratio of at least 1:1 and no greater than 500:1 by mass; and the composition comprises tetrahydrocannabinol and humulene epoxide II at a ratio of at least 10:1 and no greater than 5,000:1 by mass.

Various aspects of this patent document relate to a composition, comprising (i) the cannabinoid tetrahydrocannabivarin, (ii) the terpenes beta-caryophyllene and humulene, and (iii) the terpene oxidation products caryophyllene oxide and humulene epoxide II, in which: the composition comprises tetrahydrocannabivarin and beta-caryophyllene at a ratio of at least 1:5 and no greater than 100:1 by mass; the composition comprises tetrahydrocannabivarin and caryophyllene oxide at a ratio of at least 1:1 and no greater than 500:1 by mass; the composition comprises tetrahydrocannabivarin and humulene at a ratio of at least 1:5 and no greater than 100:1 by mass; and the composition comprises tetrahydrocannabivarin and humulene epoxide II at a ratio of at least 1:1 and no greater than 500:1 by mass.

Various aspects of this patent document relate to a composition, comprising (i) the cannabinoid cannabidiol, (ii) at least one terpene selected from beta-caryophyllene and humulene, and (iii) one or more of: 2-[(1R,6S)-6-isopropenyl-3-methylcyclohex-2-en-1-yl]-5-pentylbenzene-1,3-diol; 2-[(1S,6R)-6-isopropenyl-3-methylcyclohex-2-en-1-yl]-5-pentylbenzene-1,3-diol; 2-[(1S,6S)-6-isopropenyl-3-methylcyclohex-2-en-1-yl]-5-pentylbenzene-1,3-diol; (6aR,10aS)-6,6,9-trimethyl-3-pentyl-6a,7,8,10a-tetrahydro-6H-benzo[c]chromen-1-ol; (6aS,10aR)-6,6,9-trimethyl-3-pentyl-6a,7,8,10a-tetrahydro-6H-benzo[c]chromen-1-ol; (6aS,10aS)-6,6,9-trimethyl-3-pentyl-6a,7,8,10a-tetrahydro-6H-benzo[c]chromen-1-ol; humulene epoxide I; a stereoisomer of humulene epoxide I; humulene epoxide III; a stereoisomer of humulene epoxide III; bicyclohumuladiol; a stereoisomer of bicyclohumuladiol; tricyclohumuladiol; a stereoisomer of tricyclohumuladiol; tricyclohumuladiol II; a stereoisomer of tricyclohumuladiol II; humulenol II; and a stereoisomer of humulenol II.

Various aspects of this patent document relate to a composition, comprising (i) the cannabinoid tetrahydrocannabinol, (ii) at least one terpene selected from beta-caryophyllene and humulene, and (iii) one or more of: 2-[(1R,6S)-6-isopropenyl-3-methylcyclohex-2-en-1-yl]-5-pentylbenzene-1,3-diol; 2-[(1S,6R)-6-isopropenyl-3-methylcyclohex-2-en-1-yl]-5-pentylbenzene-1,3-diol; 2-[(1S,6S)-6-isopropenyl-3-methylcyclohex-2-en-1-yl]-5-pentylbenzene-1,3-diol; (6aR,10aS)-6,6,9-trimethyl-3-pentyl-6a,7,8,10a-tetrahydro-6H-benzo[c]chromen-1-ol; (6aS,10aR)-6,6,9-trimethyl-3-pentyl-6a,7,8,10a-tetrahydro-6H-benzo[c]chromen-1-ol; (6aS,10aS)-6,6,9-trimethyl-3-pentyl-6a,7,8,10a-tetrahydro-6H-benzo[c]chromen-1-ol; humulene epoxide I; a stereoisomer of humulene epoxide I; humulene epoxide III; a stereoisomer of humulene epoxide III; bicyclohumuladiol; a stereoisomer of bicyclohumuladiol; tricyclohumuladiol; a stereoisomer of tricyclohumuladiol; tricyclohumuladiol II; a stereoisomer of tricyclohumuladiol II; humulenol II; and a stereoisomer of humulenol II.

Various aspects of this patent document relate to a composition, comprising (i) the cannabinoid cannabidivarin, (ii) at least one terpene selected from beta-caryophyllene and humulene, and (iii) one or more of: 2-[(1R,6S)-6-isopropenyl-3-methylcyclohex-2-en-1-yl]-5-propylbenzene-1,3-diol; 2-[(1S,6R)-6-isopropenyl-3-methylcyclohex-2-en-1-yl]-5-propylbenzene-1,3-diol; 2-[(1S,6S)-6-isopropenyl-3-methylcyclohex-2-en-1-yl]-5-propylbenzene-1,3-diol; (6aR,10aS)-6,6,9-trimethyl-3-propyl-6a,7,8,10a-tetrahydro-6H-benzo[c]chromen-1-ol; (6aS,10aR)-6,6,9-trimethyl-3-propyl-6a,7,8,10a-tetrahydro-6H-benzo[c]chromen-1-ol; (6aS,10aS)-6,6,9-trimethyl-3-propyl-6a,7,8,10a-tetrahydro-6H-benzo[c]chromen-1-ol; humulene epoxide I; a stereoisomer of humulene epoxide I; humulene epoxide III; a stereoisomer of humulene epoxide III; bicyclohumuladiol; a stereoisomer of bicyclohumuladiol; tricyclohumuladiol; a stereoisomer of tricyclohumuladiol; tricyclohumuladiol II; a stereoisomer of tricyclohumuladiol II; humulenol II; and a stereoisomer of humulenol II.

Various aspects of this patent document relate to a composition, comprising (i) the cannabinoid tetrahydrocannabivarin, (ii) at least one terpene selected from beta-caryophyllene and humulene, and (iii) one or more of: 2-[(1R,6S)-6-isopropenyl-3-methylcyclohex-2-en-1-yl]-5-propylbenzene-1,3-diol; 2-[(1S,6R)-6-isopropenyl-3-methylcyclohex-2-en-1-yl]-5-propylbenzene-1,3-diol; 2-[(1S,6S)-6-isopropenyl-3-methylcyclohex-2-en-1-yl]-5-propylbenzene-1,3-diol; (6aR,10aS)-6,6,9-trimethyl-3-propyl-6a,7,8,10a-tetrahydro-6H-benzo[c]chromen-1-ol; (6aS,10aR)-6,6,9-trimethyl-3-propyl-6a,7,8,10a-tetrahydro-6H-benzo[c]chromen-1-ol; (6aS,10aS)-6,6,9-trimethyl-3-propyl-6a,7,8,10a-tetrahydro-6H-benzo[c]chromen-1-ol; humulene epoxide I; a stereoisomer of humulene epoxide I; humulene epoxide III; a stereoisomer of humulene epoxide III; bicyclohumuladiol; a stereoisomer of bicyclohumuladiol; tricyclohumuladiol; a stereoisomer of tricyclohumuladiol; tricyclohumuladiol II; a stereoisomer of tricyclohumuladiol II; humulenol II; and a stereoisomer of humulenol II.

In some embodiments, the composition comprises tetrahydrocannabinol and (6aS,10aR)-6,6,9-trimethyl-3-pentyl-6a,7,8,10a-tetrahydro-6H-benzo[c]chromen-1-ol at a ratio of at least 1:20 and no greater than 20:1 by mass.

Various aspects of this patent document relate to a composition, comprising the cannabinoid tetrahydrocannabinol and (6aS,10aR)-6,6,9-trimethyl-3-pentyl-6a,7,8,10a-tetrahydro-6H-benzo[c]chromen-1-ol at a ratio of at least 1:20 and no greater than 20:1 by mass. In some specific embodiments, the composition comprises tetrahydrocannabinol and (6aS,10aR)-6,6,9-trimethyl-3-pentyl-6a,7,8,10a-tetrahydro-6H-benzo[c]chromen-1-ol at a ratio of at least 1:10 and no greater than 10:1 by mass. In some embodiments, the composition further comprises cannabichromene. In some embodiments, the composition further comprises cannabidiol.

In some embodiments, the composition comprises tetrahydrocannabivarin and (6aS,10aR)-6,6,9-trimethyl-3-propyl-6a,7,8,10a-tetrahydro-6H-benzo[c]chromen-1-ol at a ratio of at least 1:20 and no greater than 20:1 by mass.

Various aspects of this patent document relate to a composition, comprising the cannabinoid tetrahydrocannabivarin and (6aS,10aR)-6,6,9-trimethyl-3-propyl-6a,7,8,10a-tetrahydro-6H-benzo[c]chromen-1-ol at a ratio of at least 1:20 and no greater than 20:1 by mass. In some specific embodiments, the composition comprises tetrahydrocannabivarin and (6aS,10aR)-6,6,9-trimethyl-3-propyl-6a,7,8,10a-tetrahydro-6H-benzo[c]chromen-1-ol at a ratio of at least 1:10 and no greater than 10:1 by mass. In some embodiments, the composition further comprises cannabichromevarin. In some embodiments, the composition further comprises cannabidivarin.

In some embodiments, the composition comprises cannabidiol and 2-[(1R,6S)-6-isopropenyl-3-methylcyclohex-2-en-1-yl]-5-pentylbenzene-1,3-diol at a ratio of at least 10:1 and no greater than 10,000:1 by mass.

Various aspects of this patent document relate to a composition, comprising the cannabinoid cannabidiol and 2-[(1R,6S)-6-isopropenyl-3-methylcyclohex-2-en-1-yl]-5-pentylbenzene-1,3-diol at a ratio of at least 10:1 and no greater than 10,000:1 by mass.

In some embodiments, the composition comprises cannabidiol and 2-[(1S,6R)-6-isopropenyl-3-methylcyclohex-2-en-1-yl]-5-pentylbenzene-1,3-diol at a ratio of at least 10:1 and no greater than 10,000:1 by mass.

Various aspects of this patent document relate to a composition, comprising the cannabinoid cannabidiol and 2-[(1S,6R)-6-isopropenyl-3-methylcyclohex-2-en-1-yl]-5-pentylbenzene-1,3-diol at a ratio of at least 10:1 and no greater than 10,000:1 by mass.

In some embodiments, the composition comprises cannabidivarin and 2-[(1R,6S)-6-isopropenyl-3-methylcyclohex-2-en-1-yl]-5-propylbenzene-1,3-diol at a ratio of at least 10:1 and no greater than 10,000:1 by mass.

Various aspects of this patent document relate to a composition, comprising the cannabinoid cannabidivarin and 2-[(1R,6S)-6-isopropenyl-3-methylcyclohex-2-en-1-yl]-5-propylbenzene-1,3-diol at a ratio of at least 10:1 and no greater than 10,000:1 by mass.

In some embodiments, the composition comprises cannabidivarin and 2-[(1S,6R)-6-isopropenyl-3-methylcyclohex-2-en-1-yl]-5-propylbenzene-1,3-diol at a ratio of at least 10:1 and no greater than 10,000:1 by mass.

Various aspects of this patent document relate to a composition, comprising the cannabinoid cannabidivarin and 2-[(1S,6R)-6-isopropenyl-3-methylcyclohex-2-en-1-yl]-5-propylbenzene-1,3-diol at a ratio of at least 10:1 and no greater than 10,000:1 by mass.

In some embodiments, the composition comprises cannabidiol and tetrahydrocannabinol at a ratio of at least 1:1 and no greater than 10,000:1 by mass.

In some embodiments, the composition comprises cannabichromene and tetrahydrocannabinol at a ratio greater than 1:1 and no greater than 1,000:1 by mass.

In some embodiments, the composition comprises cannabigerol and tetrahydrocannabinol at a ratio greater than 1:1 and no greater than 1,000:1 by mass.

In some embodiments, the composition comprises cannabidiol and cannabinol at a ratio of at least 100:1 and no greater than 10,000:1 by mass.

In some embodiments, the composition comprises cannabidivarin and tetrahydrocannabivarin at a ratio of at least 1:1 and no greater than 10,000:1 by mass.

In some embodiments, the composition comprises cannabichromevarin and tetrahydrocannabivarin at a ratio greater than 1:1 and no greater than 1,000:1 by mass.

In some embodiments, the composition comprises cannabigerovarin and tetrahydrocannabivarin at a ratio greater than 1:1 and no greater than 1,000:1 by mass.

In some embodiments, the composition comprises cannabidivarin and cannabivarin at a ratio of at least 100:1 and no greater than 10,000:1 by mass.

In some embodiments, the composition comprises cannabidiol and cannabidivarin at a ratio of at least 1:50 and no greater than 50:1 by mass.

In some embodiments, the composition comprises tetrahydrocannabinol and tetrahydrocannabivarin at a ratio of at least 1:50 and no greater than 50:1 by mass.

In some embodiments, the composition comprises cannabigerol and cannabigerovarin at a ratio of at least 1:50 and no greater than 50:1 by mass.

In some embodiments, the composition comprises beta-caryophyllene and caryophyllene oxide at a ratio of at least 1:1 and no greater than 1,000:1 by mass.

In some embodiments, the composition comprises humulene and humulene epoxide I at a ratio of at least 1:1 and no greater than 10,000:1 by mass.

In some embodiments, the composition comprises humulene and humulene epoxide II at a ratio of at least 1:10 and no greater than 1,000:1 by mass.

In some embodiments, the composition comprises humulene and humulene epoxide III at a ratio of at least 1:1 and no greater than 10,000:1 by mass.

In some embodiments, the composition comprises humulene and bicyclohumuladiol at a ratio of at least 1:10 and no greater than 1,000:1 by mass.

In some embodiments, the composition comprises humulene and tricyclohumuladiol at a ratio of at least 1:10 and no greater than 1,000:1 by mass.

In some embodiments, the composition comprises humulene and tricyclohumuladiol II at a ratio of at least 1:1 and no greater than 10,000:1 by mass.

In some embodiments, the composition comprises humulene and humulenol II at a ratio of at least 1:1 and no greater than 10,000:1 by mass.

In some embodiments, the composition comprises cannabidiol, tetrahydrocannabinol, cannabichromene, cannabigerol, cannabinol, cannabidivarin, and (6aS,10aR)-6,6,9-trimethyl-3-pentyl-6a,7,8,10a-tetrahydro-6H-benzo[c]chromen-1-ol, in which the composition comprises: the cannabidiol at a concentration of at least 1 percent and no greater than 99 percent by mass; the cannabidiol and the tetrahydrocannabinol at a ratio of at least 1:1 and no greater than 10,000:1 by mass; the tetrahydrocannabinol and the (6aS,10aR)-6,6,9-trimethyl-3-pentyl-6a,7,8,10a-tetrahydro-6H-benzo[c]chromen-1-ol at a ratio of at least 1:10 and no greater than 10:1 by mass; the cannabichromene and the tetrahydrocannabinol at a ratio greater than 1:1 and no greater than 1,000:1 by mass; the cannabigerol and the tetrahydrocannabinol at a ratio greater than 1:1 and no greater than 1,000:1 by mass; the cannabidiol and the cannabinol at a ratio of at least 100:1 and no greater than 10,000:1 by mass; and the cannabidiol and the cannabidivarin at a ratio of at least 10:1 and no greater than 100:1 by mass. In some specific embodiments, the composition comprises cannabidiol at a concentration of at least 50 percent and no greater than 99 percent by mass. In some specific embodiments, the composition comprises the cannabidiol at a concentration of at least 1 percent and no greater than 50 percent by mass.

In some embodiments, the composition comprises cannabidivarin, tetrahydrocannabivarin, cannabichromevarin, cannabigerovarin, cannabivarin, and (6aS,10aR)-6,6,9-trimethyl-3-propyl-6a,7,8,10a-tetrahydro-6H-benzo[c]chromen-1-ol, in which the composition comprises: the cannabidivarin at a concentration of at least 1 percent and no greater than 99 percent by mass; the cannabidivarin and the tetrahydrocannabivarin at a ratio of at least 1:1 and no greater than 10,000:1 by mass; the tetrahydrocannabivarin and the (6aS,10aR)-6,6,9-trimethyl-3-propyl-6a,7,8,10a-tetrahydro-6H-benzo[c]chromen-1-ol at a ratio of at least 1:10 and no greater than 10:1 by mass; the cannabichromevarin and the tetrahydrocannabivarin at a ratio greater than 1:1 and no greater than 1,000:1 by mass; the cannabigerovarin and the tetrahydrocannabivarin at a ratio greater than 1:1 and no greater than 1,000:1 by mass; and the cannabidivarin and the cannabivarin at a ratio of at least 100:1 and no greater than 10,000:1 by mass.

In some embodiments, the composition comprises beta-caryophyllene, caryophyllene oxide, humulene, and humulene epoxide II, in which the composition comprises: the beta-caryophyllene and the caryophyllene oxide at a ratio of at least 1:1 and no greater than 1,000:1 by mass; and the humulene and the humulene epoxide II at a ratio of at least 1:1 and no greater than 1,000:1 by mass.

In some embodiments, the composition comprises humulene and one or more of humulene epoxide I; a stereoisomer of humulene epoxide I; humulene epoxide II; a stereoisomer of humulene epoxide II; humulene epoxide III; a stereoisomer of humulene epoxide III; bicyclohumuladiol; a stereoisomer of bicyclohumuladiol; tricyclohumuladiol; a stereoisomer of tricyclohumuladiol; tricyclohumuladiol II; a stereoisomer of tricyclohumuladiol II; humulenol II; and a stereoisomer of humulenol II.

In some embodiments, the composition comprises a solvent at a concentration greater than 50 percent by mass, in which the solvent is an alcohol or a vegetable oil, and the cannabinoid is a solute that is dissolved in the solvent. In some specific embodiments, the solvent is an alcohol, and the alcohol is ethanol, propane-1,2-diol, or propane-1,3-diol. In some specific embodiments, the solvent is a vegetable oil, and the vegetable oil comprises one or more of coconut oil, palm kernel oil, avocado oil, hempseed oil, sunflower seed oil, grapeseed oil, cottonseed oil, peanut oil, canola oil, olive oil, and soybean oil.

In some embodiments, the composition comprises water, in which the composition is a beverage. In some preferred embodiments, the composition is not beer, and the composition lacks any ingredient that is derived from hops.

Various combinations of the features disclosed in this patent document will be evident to those of ordinary skill, and these combinations are expressly contemplated. This patent document discloses each linguistic and grammatical combination of different features disclosed anywhere in the patent document as though any specific combination were disclosed in the same sentence. The language and grammar of this patent document are intentionally selected to explicitly clarify the combinations contemplated such that, for example, dependent claims that feature a generic cannabinoid can depend from a claim that features a specific cannabinoid. The words "comprising," "comprises," and "comprise" refer to open-ended sets. For example, a composition comprising cannabigerol can also comprise cannabidiol.

What is claimed is:

1. A composition, comprising a decarboxylated hemp or cannabis extract that comprises cannabigerol, beta-caryophyllene, humulene, caryophyllene oxide, humulene epoxide II, bicyclohumuladiol, and a cannabinoid selected from cannabidiol and tetrahydrocannabinol. wherein:

the composition comprises the cannabinoid and the beta-caryophyllene at a ratio of at least 1:1 and no greater than 500:1 by mass (cannabinoid: beta-caryophyllene);

the composition comprises the cannabinoid and the caryophyllene oxide at a ratio of at least 10:1 and no greater than 5,000:1 by mass (cannabinoid: caryophyllene oxide);

the composition comprises the cannabinoid and the humulene at a ratio of at least 1:1 and no greater than 500:1 by mass (cannabinoid: humulene);

the composition comprises the cannabinoid and the humulene epoxide II at a ratio of at least 10:1 and no greater than 5,000:1 by mass (cannabinoid: humulene epoxide II); and the composition comprises the humulene and the bicyclohumuladiol at a ratio of at least 1:10 and no greater than 1,000:1 by mass (humulene: bicyclohumuladiol).

2. The composition of claim 1, comprising the beta-caryophyllene and the caryophyllene oxide at a ratio of at least 1:1 by mass (beta-caryophyllene: caryophyllene oxide).

3. The composition of claim 1, comprising the humulene and the humulene epoxide II at a ratio of at least 1:10 by mass (humulene: humulene epoxide II).

4. A composition, comprising a decarboxylated hemp or cannabis extract that comprises cannabigerol, beta-caryophyllene, humulene, caryophyllene oxide, humulene epoxide II, tricyclohumuladiol, and a cannabinoid selected from cannabidiol and tetrahydrocannabinol, wherein:

the composition comprises the cannabinoid and the beta-caryophyllene at a ratio of at least 1:1 and no greater than 500:1 by mass (cannabinoid: beta-caryophyllene);

the composition comprises the cannabinoid and the caryophyllene oxide at a ratio of at least 10:1 and no greater than 5,000:1 by mass (cannabinoid: caryophyllene oxide);

the composition comprises the cannabinoid and the humulene at a ratio of at least 1:1 and no greater than 500:1 by mass (cannabinoid: humulene);

the composition comprises the cannabinoid and the humulene epoxide II at a ratio of at least 10:1 and no greater than 5,000:1 by mass (cannabinoid: humulene epoxide II); and the composition comprises the humulene and the tricyclohumuladiol at a ratio of at least 1:10 and no greater than 1,000:1 by mass (humulene: tricyclohumuladiol).

5. A composition, comprising a decarboxylated hemp or cannabis extract that comprises cannabigerol, beta-caryophyllene, humulene, caryophyllene oxide, humulene epoxide II, tricyclohumuladiol II, and a cannabinoid selected from cannabidiol and tetrahydrocannabinol, wherein:

the composition comprises the cannabinoid and the beta-caryophyllene at a ratio of at least 1:1 and no greater than 500:1 by mass (cannabinoid: beta-caryophyllene);

the composition comprises the cannabinoid and the caryophyllene oxide at a ratio of at least 10:1 and no greater than 5,000:1 by mass (cannabinoid: caryophyllene oxide);

the composition comprises the cannabinoid and the humulene at a ratio of at least 1:1 and no greater than 500:1 by mass (cannabinoid: humulene);

the composition comprises the cannabinoid and the humulene epoxide II at a ratio of at least 10:1 and no greater than 5,000:1 by mass (cannabinoid: humulene epoxide II); and the composition comprises the humulene and the tricyclohumuladiol II at a ratio of at least 1:1 and no greater than 10,000:1 by mass (humulene: tricyclohumuladiol II).

6. The composition of claim 1, comprising:

the beta-caryophyllene and the caryophyllene oxide at a ratio of at least 1:1 by mass (beta-caryophyllene: caryophyllene oxide); and the humulene and the humulene epoxide II at a ratio of at least 1:1 by mass (humulene: humulene epoxide II).

7. The composition of claim 1, comprising one or more of a stereoisomer of bicyclohumuladiol; tricyclohumuladiol; a stereoisomer of tricyclohumuladiol; tricyclohumuladiol II; and a stereoisomer of tricyclohumuladiol II.

8. The composition of claim 1, wherein the composition is a decarboxylated hemp extract, and the cannabinoid is cannabidiol.

9. The composition of claim 1, wherein the composition is a decarboxylated cannabis extract, and the cannabinoid is tetrahydrocannabinol.

10. The composition of claim 4, comprising the beta-caryophyllene and the caryophyllene oxide at a ratio of at least 1:1 by mass (beta-caryophyllene: caryophyllene oxide).

11. The composition of claim 4, comprising the humulene and the humulene epoxide II at a ratio of at least 1:10 by mass (humulene: humulene epoxide II).

12. The composition of claim 4, comprising:

the beta-caryophyllene and the caryophyllene oxide at a ratio of at least 1:1 by mass (beta-caryophyllene: caryophyllene oxide); and the humulene and the humulene epoxide II at a ratio of at least 1:1 by mass (humulene: humulene epoxide II).

13. The composition of claim 4, comprising one or more of bicyclohumuladiol; a stereoisomer of bicyclohumuladiol; a stereoisomer of tricyclohumuladiol; tricyclohumuladiol II; and a stereoisomer of tricyclohumuladiol II.

14. The composition of claim 4, wherein the cannabinoid is cannabidiol.

15. The composition of claim 4, wherein the cannabinoid is tetrahydrocannabinol.

16. The composition of claim 5, comprising the beta-caryophyllene and the caryophyllene oxide at a ratio of at least 1:1 by mass (beta-caryophyllene: caryophyllene oxide).

17. The composition of claim 5, comprising the humulene and the humulene epoxide II at a ratio of at least 1:10 by mass (humulene: humulene epoxide II).

18. The composition of claim 5, comprising:

the beta-caryophyllene and the caryophyllene oxide at a ratio of at least 1:1 by mass (beta-caryophyllene: caryophyllene oxide); and the humulene and the humulene epoxide II at a ratio of at least 1:1 by mass (humulene: humulene epoxide II).

19. The composition of claim 5, comprising one or more of bicyclohumuladiol; a stereoisomer of bicyclohumuladiol; tricyclohumuladiol; a stereoisomer of tricyclohumuladiol; and a stereoisomer of tricyclohumuladiol II.

20. The composition of claim 5, wherein the cannabinoid is tetrahydrocannabinol.

* * * * *